(12) United States Patent
Luciano

(10) Patent No.: US 9,189,002 B1
(45) Date of Patent: Nov. 17, 2015

(54) SINGLE-INDUCTOR POWER CONVERTER WITH BUCK-BOOST CAPABILITY

(71) Applicant: Maxim Integrated Products, Inc., San Jose, CA (US)

(72) Inventor: Giuseppe Luciano, Brugherio (IT)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 483 days.

(21) Appl. No.: 13/721,331

(22) Filed: Dec. 20, 2012

(51) Int. Cl.
G05F 1/585 (2006.01)
H02M 3/158 (2006.01)
H02M 1/00 (2007.01)

(52) U.S. Cl.
CPC ............. G05F 1/585 (2013.01); H02M 3/1582 (2013.01); H02M 2001/009 (2013.01)

(58) Field of Classification Search
CPC ................ G05F 1/585; H02M 3/1582; H02M 2001/009
USPC .......................................................... 307/31
See application file for complete search history.

(56) References Cited

U.S. PATENT DOCUMENTS

| 5,617,015 A | 4/1997 | Goder et al. ................... 323/282 |
| 6,075,295 A | 6/2000 | Li ..................................... 307/39 |
| 7,276,886 B2* | 10/2007 | Kinder et al. .................. 323/267 |
| 8,232,790 B2* | 7/2012 | Leong et al. ................... 323/285 |
| 2007/0085519 A1* | 4/2007 | Xu .................................... 323/282 |
| 2010/0039080 A1 | 2/2010 | Schoenbauer et al. ........ 323/234 |
| 2010/0045110 A1* | 2/2010 | Liu et al. .......................... 307/32 |

* cited by examiner

*Primary Examiner* — Scott Bauer

(57) ABSTRACT

A power converter includes an inductor, a first switch and a second switch. A summing module generates a voltage sum based on a ramp voltage and a first voltage based on a sensed inductor current. Error amplifier modules generate error voltages. A comparing and control signal generating module generates first and second switching signals and skip signals. A state machine module switches the first and second switches based on the first switching signal, the second switching signal and the skip signals. The state machine module, during a single clock period, operates in one of a two phase mode with a $T_{ON}$ phase during which the inductor is charged and one $T_{OFF}$ phase during which one of a first load and a second load is fed and a three phase mode with the $T_{ON}$ phase and two $T_{OFF}$ phases during which both the first load and the second load are sequentially fed.

16 Claims, 5 Drawing Sheets

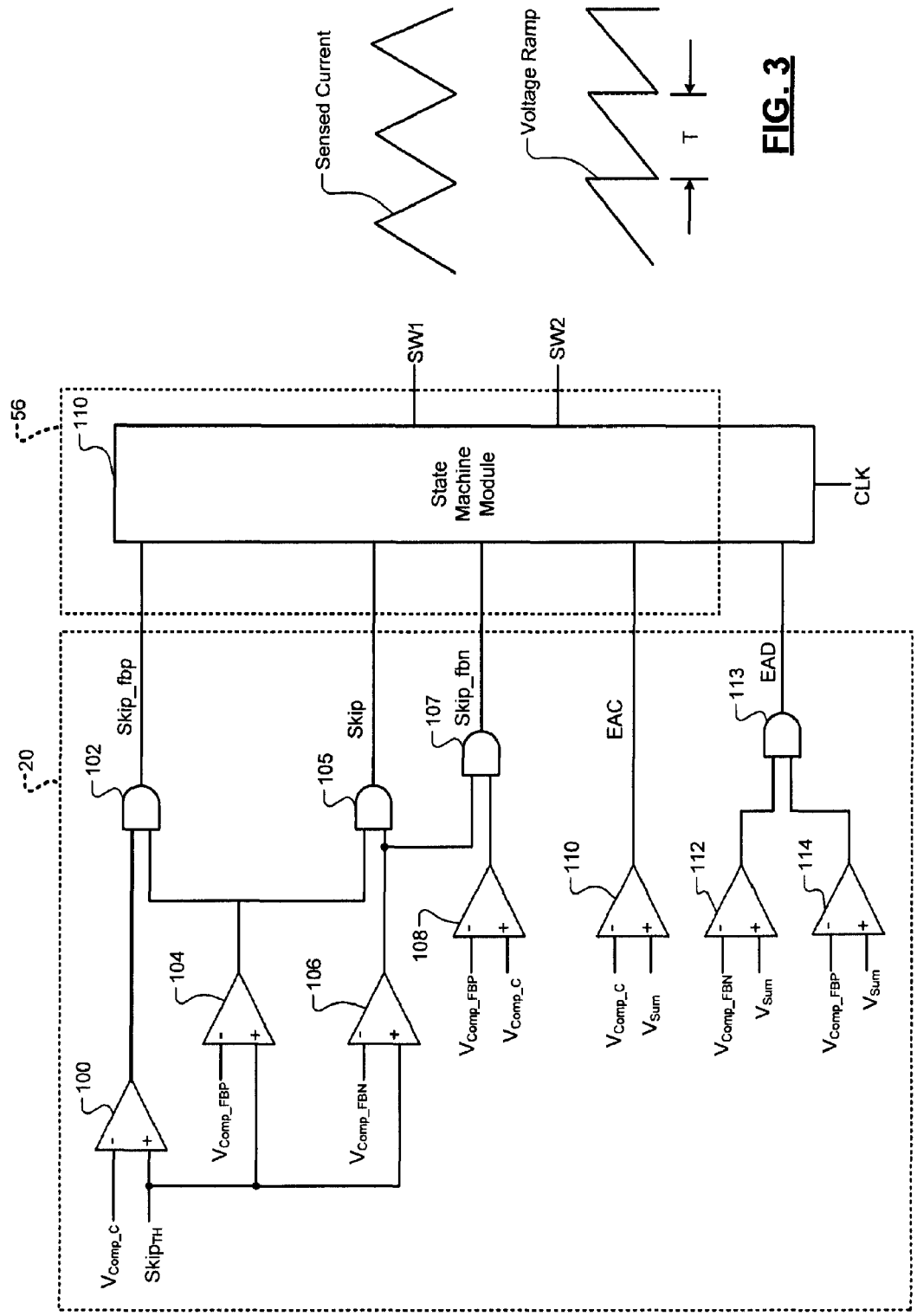

SINGLE-INDUCTOR POWER CONVERTER WITH BUCK-BOOST CAPABILITY

FIELD

The present disclosure relates to power converters, and more particularly to a single-inductor power converter to supply positive and negative voltages to first and second loads.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some power converters may be used to regulate positive and negative voltage using switching regulators. These power converters typically use many internal switches and two or more external inductors. Reducing the number of switches and external inductors used to implement the power converters tends to reduce the cost of the power converter.

SUMMARY

A power converter includes an inductor, a first switch including a control terminal, a first terminal connected to a reference potential and a second terminal connected to one terminal of the inductor, and a second switch including a control terminal, a first terminal connected to another terminal of the inductor and a second terminal connected to a reference potential. A summing module generates a voltage sum based on a ramp voltage and a first voltage based on a sensed inductor current. A plurality of error amplifier modules generates error voltages. A comparing and control signal generating module generates first and second switching signals and skip signals based on the error voltages and the voltage sum. A state machine module connected to the control terminals of the first switch and the second switch switches the first switch and the second switch based on the first switching signal, the second switching signal and the skip signals. The state machine module, during a single clock period, operates in one of a two phase mode with a $T_{ON}$ phase during which the inductor is charged and one $T_{OFF}$ phase during which one of a first load and a second load is fed and a three phase mode with the $T_{ON}$ phase and two $T_{OFF}$ phases during which both the first load and the second load are sequentially fed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is an electrical schematic and functional block diagram of an example of a comparing and control signal generating module and a switch control module according to the present disclosure;

FIG. 3 illustrates an example of a sensed inductor current and a voltage ramp;

In the drawings, reference numbers may be reused to identify similar and/or identical elements.

DETAILED DESCRIPTION

Figure 1:
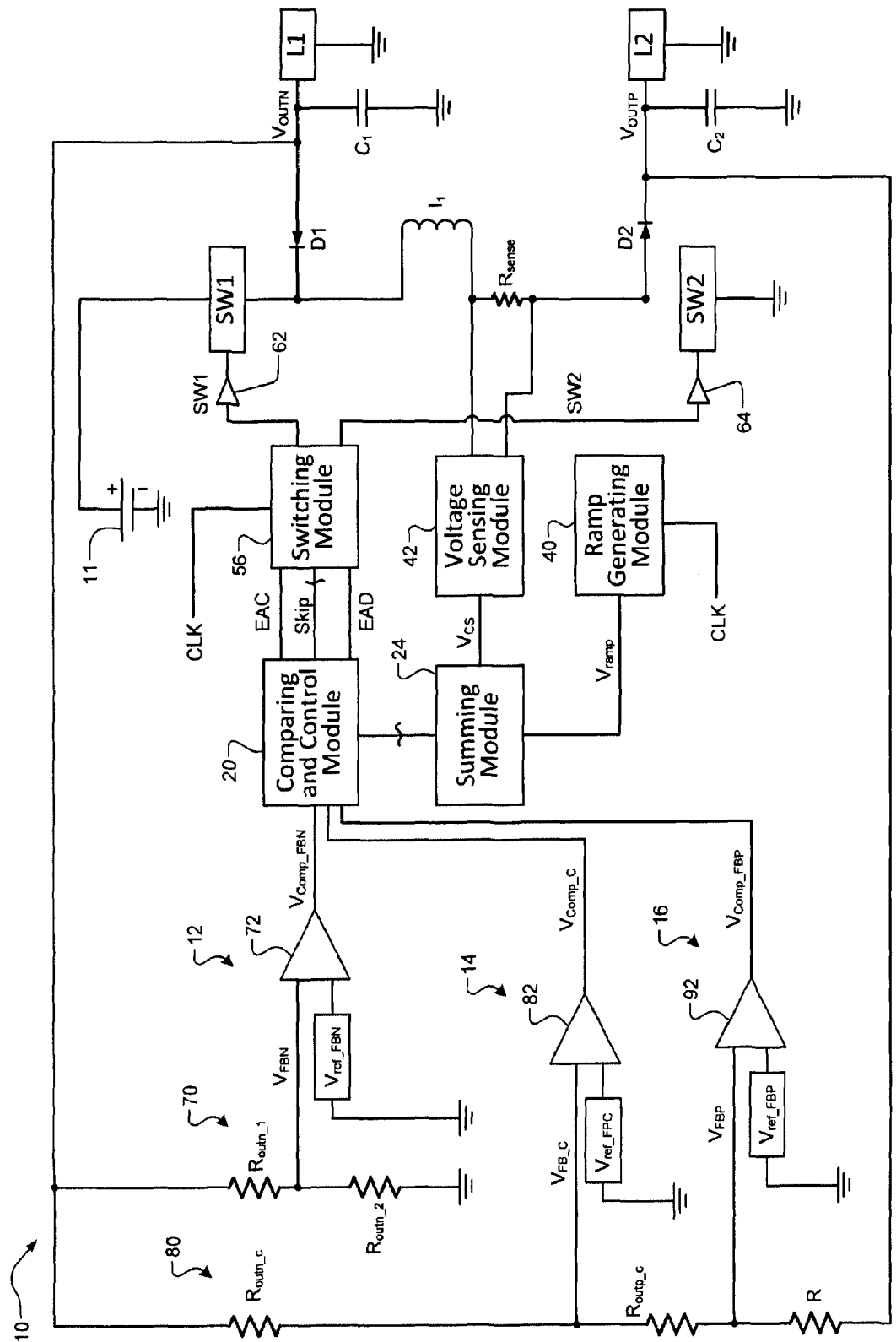
FIG. 1 is an electrical schematic and functional block diagram of an example of a power converter according to the present disclosure.

A power converter according to the present disclosure regulates positive and negative voltage using switching regulators with a single inductor and only four switches (or two switches plus two diodes). FIG. 1 shows an example of a power converter 10 that includes an inductor I1 connected between a first switch SW1 and a second switch SW2. A battery 11 is connected to a first terminal of the switch SW1. A second terminal of the switch SW2 is connected to a reference potential such as ground.

A first capacitor C1 is connected to an anode of a diode D1. As can be appreciated, the diode D1 may be replaced by a switch. A first load L1 is connected to the first capacitor C1. A cathode of the diode D1 is connected to a first end of the inductor I1 and to a terminal of the switch SW1. A second capacitor C2 is connected to a cathode of a diode D2. As can be appreciated, the diode D2 may be replaced by a switch. A second load L2 is connected to the first capacitor C1. An anode of the diode D2 is connected to a second end of the inductor I1 and to a terminal of the switch SW2.

The power converter 10 also includes a first error module 12, a second error module 14, and a third error module 16. Outputs of the first, second and third error modules 12, 14 and 16, respectively, are input to a comparing and control signal generating module 20. The comparing and control signal generating module 20 also receives an output of a summing module 24. The summing module 24 sums a ramp voltage $V_{ramp}$ output by a ramp generating module 30 and a current sense voltage $V_{CS}$ output by a voltage sensing module 42. The voltage sensing module 42 is connected to terminals of a resistance $R_{sense}$ connected in series with the inductor I1. The resistance $R_{sense}$ may be an external resistance. The voltage sensing module 42 may include a differential amplifier, although other circuits may be used.

The comparing and control signal generating module 20 outputs the skip signals and the switching signals EAC and EAD to a switch control module 56, which also receives a clock input CLK. The switch control module 56 outputs first and second switch control signals SW1 and SW2 to inputs of amplifiers 62 and 64. The amplifiers 62 and 64 have outputs connected to control terminals of the switches SW1 and SW2, respectively.

The first error module 12 includes resistances $R_{outn\_1}$ and $R_{outn\_2}$ that are arranged as a voltage divider 70. One end of the resistance $R_{outn\_1}$ of the voltage divider 70 is connected to one terminal of the capacitor C1. One end of the resistance $R_{outn\_2}$ of the voltage divider 70 is connected to a reference potential such as ground. A negative feedback voltage $V_{FBN}$ output by the voltage divider 70 is input to one input of an error amplifier 72. A voltage reference $V_{ref\_FBN}$ is connected to an input of the error amplifier 72. The voltage divider 70 and $V_{ref\_FBN}$ are used to set a negative output voltage $V_{outn}$. The error amplifier 72 outputs a voltage $V_{comp\_FBN}$ to the comparing and control signal generating module 20.

The second error module 14 includes resistances $R_{outn\_c}$, $R_{outp\_c}$ and R that are arranged as a multi-node voltage divider 80. One end of the resistance $R_{outn\_c}$ of the voltage divider 70 is connected to one terminal of the capacitor C1. One end of the resistance R of the voltage divider 80 is connected to one terminal of the capacitor C2. A node between resistances $R_{outn\_c}$ and $R_{outp\_c}$ generates a feedback voltage $V_{FB\_C}$ that is input to one input of an error amplifier 82. A voltage reference $V_{ref\_FPC}$ is connected to another input of the error amplifier 82. The error amplifier 82 outputs a voltage $V_{Comp\_c}$ to the comparing and control signal generating module 20.

A node between resistances $R_{outp\_c}$ and R of the voltage divider 80 generates a feedback voltage $V_{FBP}$ that is input to one input of an error amplifier 92. A voltage reference $V_{ref\_FBP}$ is connected to an input to the error amplifier 92. The reference provided between resistances $R_{outp\_c}$ and R and $V_{ref\_FBP}$ are used to set a positive output voltage $V_{outp}$. The error amplifier 92 outputs a voltage $V_{Comp\_FBP}$ to the comparing and control signal generating module 20.

Referring now to FIG. 2, an example implementation of the comparing and control signal generating module 20 is shown. While a specific implementation is shown, other circuits may be used. The comparing and control signal generating module 20 generates switching signals (EAD and EAC) and skip signals (Skip_fbn, Skip_fbp and Skip). The comparing and control signal generating module 20 includes a comparator 100 having inputs receiving the voltage $V_{Comp\_C}$ and a skip voltage reference $Skip_{TH}$. A comparator 104 receives the voltage $V_{Comp\_FBP}$ and $Skip_{TH}$. Outputs of the comparators 100 and 104 are input to an AND gate 102, which generates a skip signal skip_fbp. As can be appreciated, the AND gates described herein may be implemented using a NAND gate and an inverter.

A comparator 106 receives the voltage $V_{Comp\_FBN}$ and $Skip_{TH}$. Outputs of the comparators 104 and 106 are input to AND gate 105, which outputs the skip signal Skip. A comparator 108 receives the voltage $V_{Comp\_FBP}$ and the voltage $V_{Comp\_C}$. Outputs of the comparators 106 and 108 are input to the AND gate 107, which generates the skip signal Skip_fbn.

A comparator 110 receives the voltage $V_{Comp\_FBP}$ and the voltage $V_{Sum}$ and outputs the switching signal EAC. A comparator 112 receives the voltage $V_{Comp\_FBN}$ and the voltage $V_{Sum}$. A comparator 114 receives the voltage $V_{Comp\_FBP}$ and the voltage $V_{Sum}$. Outputs of the comparators 112 and 114 are input to AND gate 113, which generates the switching signal EAD.

For example, assuming a "skip" is desired when the load is lower than 10 mA (just an example), so the $Skip_{TH}$=10 mA*Rt (where Rt is the transresistance). When $V_{COMP\_FBP}$ is lower than $V_{skip}$, the comparator 108 will set Skip_fbp high. As a result, the power converter senses FBP has a light load and some charging cycle should be skipped. When both Skip_fbn and Skip_fbp are high, there is no need to feed the two outputs (the load is light for both) and the $T_{on}$ phase can be skipped completely.

Referring now to FIG. 3, examples of the sensed inductor current and the ramp voltage $V_{ramp}$ are shown.

Figure 4:
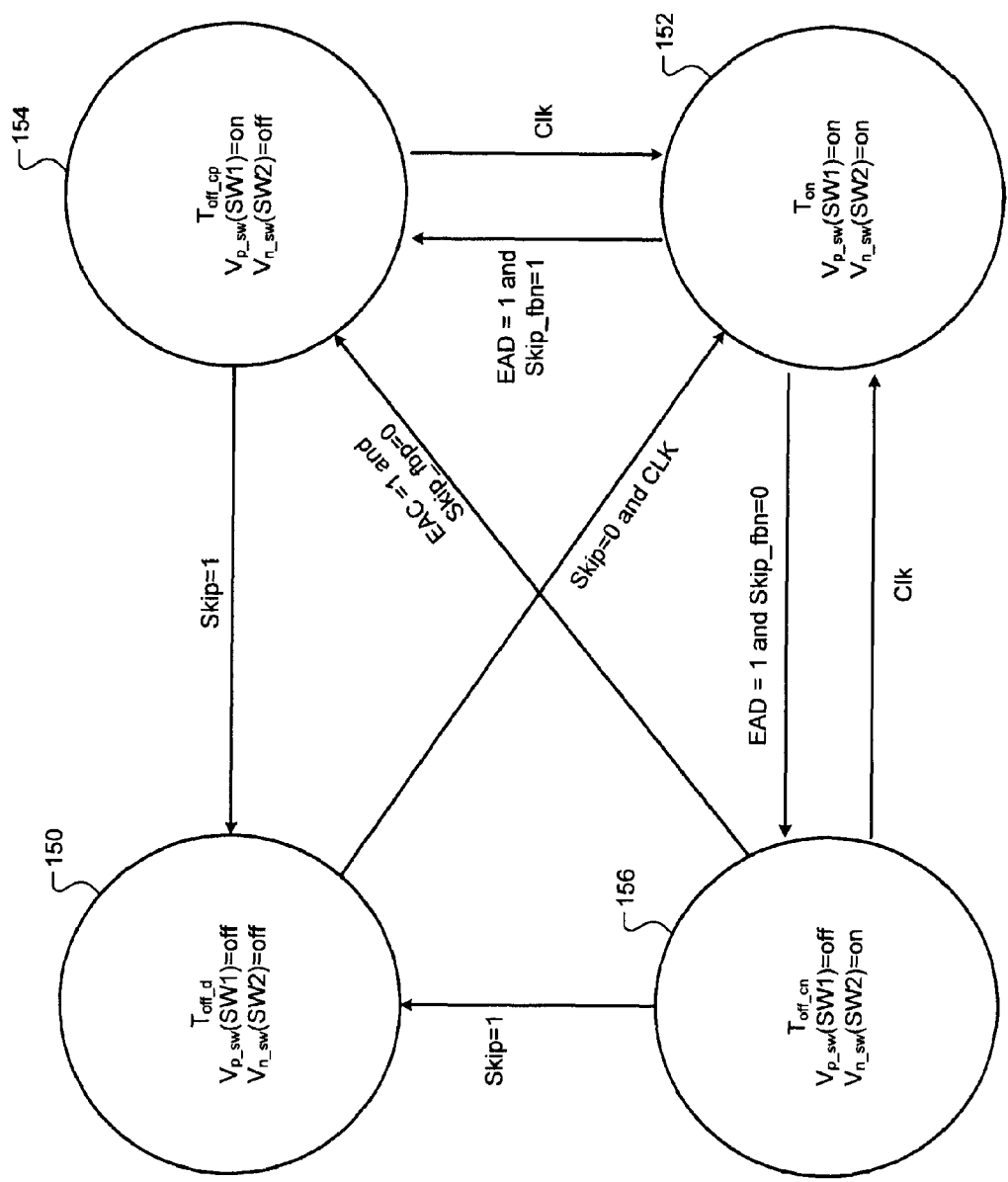
FIG. 4 is a state machine depicting an example of operation of a state machine module in the switch control module for the power converter of FIG. 1.

Referring now to FIG. 4, an example of the state machine module 110 for operating the power converter 10 is shown. The state machine module 110 transitions between first, second, third and fourth states 150, 152, 154, and 156, respectively. When power is initially supplied, control begins with state 150. Both of the switches SW1 and SW2 are in the OFF state.

The first state 150 transitions to a second state 152 when Skip=0 and CLK transitions high. In the second state 152, both switches SW1 and SW2 are in the ON state. The second state 152 transitions to a third state 154 when EAD=1 and Skip_fbn=1. In the third state 154, the first switch is on and the second switch is off. The third state 154 transitions back to the first state 150 when CLK transitions high. The third state 154 transitions to the first state 150 when Skip=1.

The second state 152 transitions to a fourth state 156 when EAD=1 and skip_fbn=0. In the fourth state 156, the first switch SW1 is OFF and the second switch SW2 is ON. The fourth state 156 transitions back to the second state 152 when CLK transitions high. The fourth state 156 transitions back to the first state 150 when Skip=1. The fourth state 156 transitions back to the second state when EAC=1 and Skip_fbp=0.

In operation, the power converter 10 has a single $T_{on}$ phase and one or two $T_{off}$ phases. During the $T_{on}$ phase, the inductor I1 is charged (both switches SW1 and SW2 are on). In a first $T_{off1}$ phase ($T_{off\_n}$), only the negative output is charged. During a second $T_{off2}$ stage ($T_{off\_p}$), only the positive output is charged.

The system and the logic is done in a way that the three phases can become two phases to charge only one of the two outputs. This function is useful when the load currents are unbalanced.

At very beginning both the switches are off. When the system is turned ON, a first $T_{on}$ phase starts. The error amplifiers 72 and 92 receive $V_{FBP}$ and $V_{FBN}$. The logic stops the $T_{on}$ phase when:

$$V_{sum} = V_{current\_sense} + V_{slope} = \max(V_{comp\_fbp}, V_{comp\_fbn})$$

where max is a maximum value of $V_{comp\_fbp}$ or $V_{comp\_fbn}$ (since one of the two regulators could be in skip mode).

The state changes from $T_{on}$ to $T_{off\_cn}$ (charging the capacitor C1 with $V_{OUTN}$) or $T_{off\_cp}$ (charging the capacitor $C_2$ with $V_{OUTP}$) according to another comparator comparing the same $V_{sum}$ and another $V_{comp\_c}$ (which is the output of the common mode error amplifier).

In case both skip signals are low (which means both $V_{OUTP}$ and $V_{OUTN}$ need to be charged), the sequence of states is:

$$Ton \rightarrow Toff\_cn \rightarrow Toff\_cp.$$

The $V_{comp\_c}$ loop is used to regulate the common mode voltage:

$$V_{FB\_c} = V_{FBP} + V_{FBN}$$

The power converter includes three different error amplifiers, each of them with their own compensation network.

For example, in a simulated implementation, $V_{REF\_FBP}$=1V, $V_{REF\_FBN}$=0V, and $V_{REFC}$=0V, although other values can be used. It is very easy to fix the output voltage by resistance divider gain. Both $V_{comp\_fbp}$ and $V_{comp\_fbn}$ have their own skip comparator. When one of the two skip signals is high, the corresponding switch is on and only one regulator is active. In the case both the skip signals are high, both SW1 and SW2 are off, which will manage unbalanced current loads.

Figure 5:
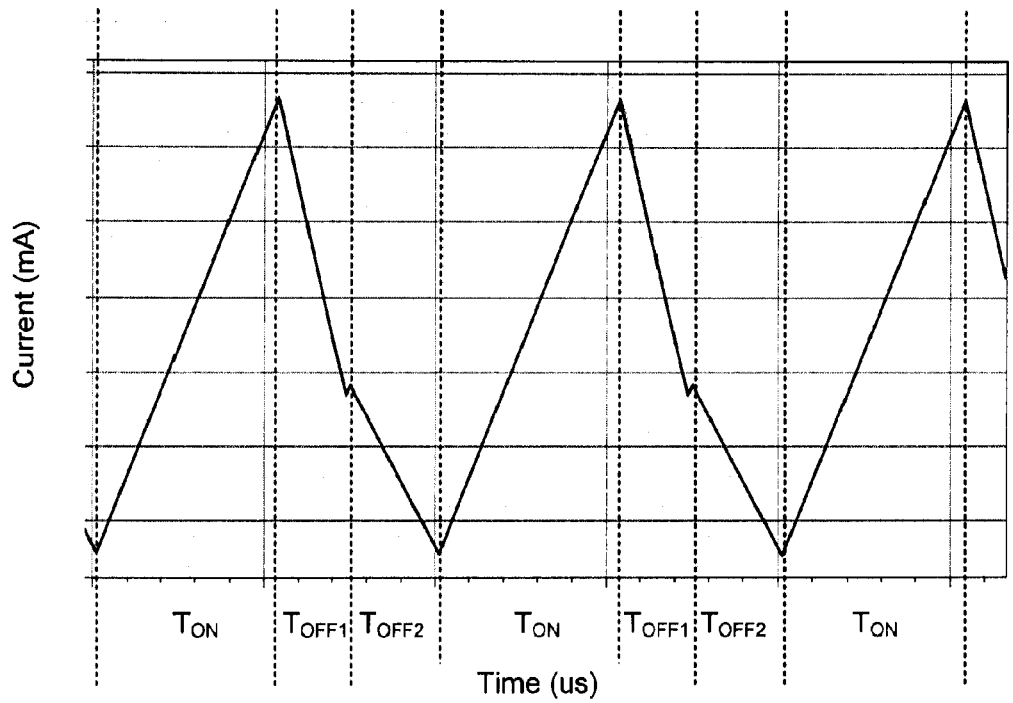
FIGS. 5 and 6 are graphs illustrating current as a function of time for different loads.
Figure 6:
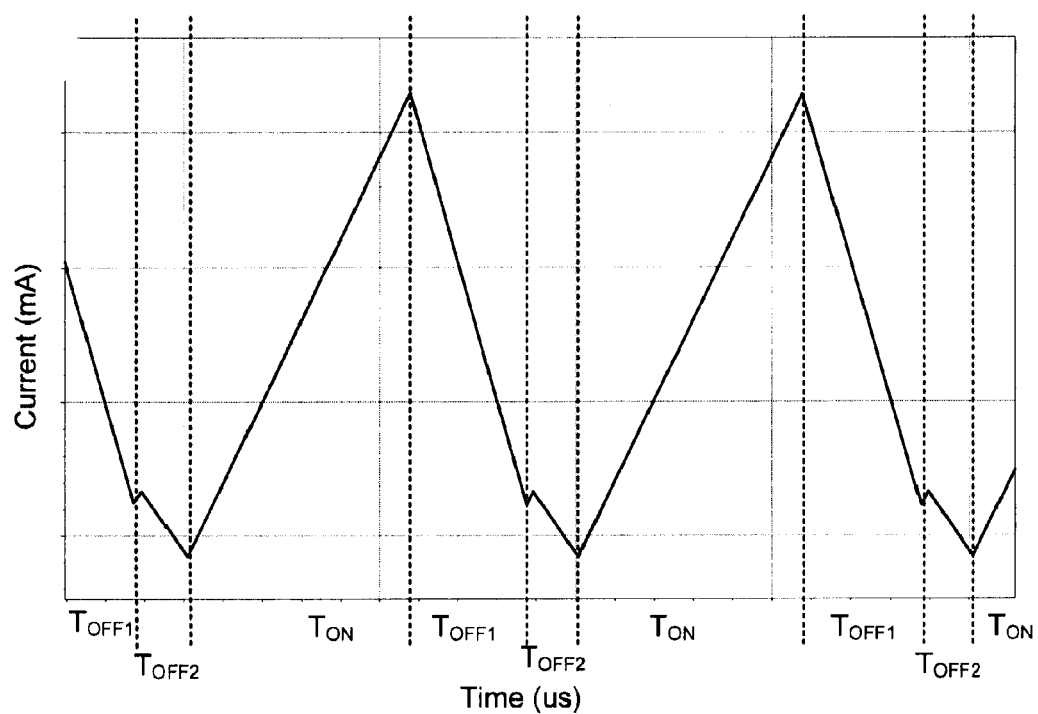

Referring now to FIGS. 5 and 6, first and second graphs illustrate examples of current as a function of time for different loads. In FIG. 5, the first and second loads are equal. For example, the first and second loads may be 100 mA. The power converter operates with three phases, $T_{ON}$, $T_{OFF1}$ and $T_{OFF2}$. The durations of $T_{OFF1}$ and $T_{OFF2}$ are approximately equal. In FIG. 6, the first and second loads are unequal. For example, the load may be 80 mA for the negative output and 10 mA for the positive output. The power converter operates with three phases, $T_{ON}$, $T_{OFF1}$ and $T_{OFF2}$. The durations of $T_{OFF1}$ and $T_{OFF2}$ are unequal. $T_{OFF1}$ is longer to compensate for the higher load on the negative output.

Figure 7:
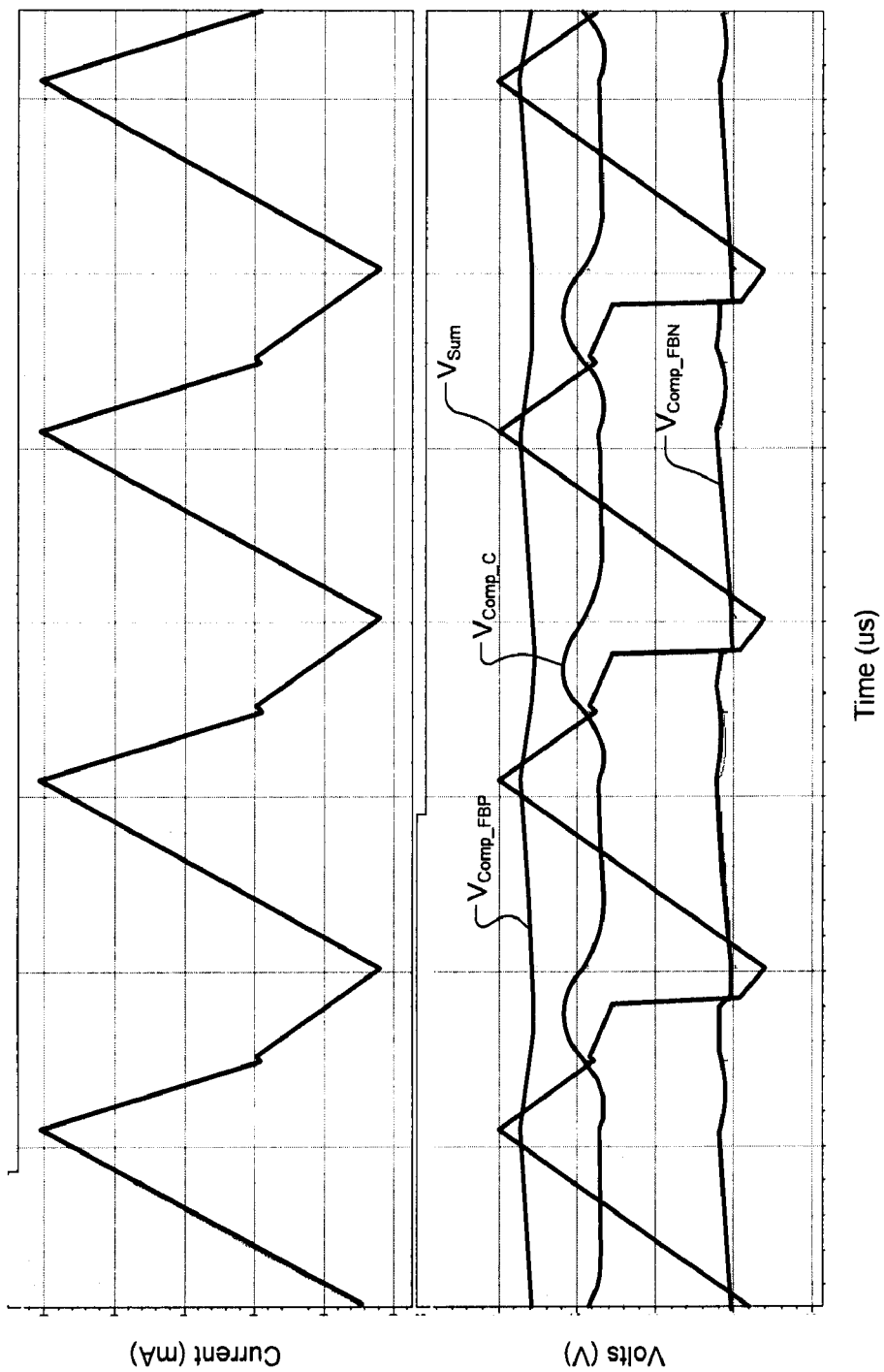
FIG. 7 are graphs illustrating current and voltage as a function of time for a load.

Referring now to FIG. 7, current and voltage are shown as a function of time for a load. The $T_{ON}$ phase ends and the $T_{OFF1}$ phase begins in response to $V_{SUM}$ increasing above $V_{Comp\_FBP}$ (triggering EAC to transition high). The $T_{OFF1}$ phase ends and the $T_{Off2}$ phase begins when $V_{Comp\_FBP}$ falls below $V_{Comp\_C}$.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational switch control module; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A power converter comprising:
   an inductor;
   a first switch including a control terminal, a first terminal connected to a reference potential and a second terminal connected to one terminal of the inductor;
   a second switch including a control terminal, a first terminal connected to another terminal of the inductor and a second terminal connected to a reference potential;
   a summing module generating a voltage sum based on a ramp voltage and a first voltage based on a sensed inductor current;
   a plurality of error amplifier modules generating error voltages;
   a comparing and control signal generating module to generate first and second switching signals and skip signals based on the error voltages and the voltage sum; and
   a state machine module connected to the control terminals of the first switch and the second switch to switch the first switch and the second switch based on the first switching signal, the second switching signal and the skip signals,
   wherein the state machine module, during a single clock period, operates in one of a two phase mode with a $T_{ON}$ phase during which the inductor is charged and one $T_{OFF}$ phase during which one of a first load and a second load is fed and a three phase mode with the $T_{ON}$ phase and two $T_{OFF}$ phases during which both the first load and the second load are sequentially fed.

2. The power converter of claim 1, wherein during the $T_{ON}$ phase, the state machine module switches both the first and second switch ON.

3. The power converter of claim 1, wherein during a first one of the $T_{OFF}$ phases, the state machine module switches one of the first switch and the second switch ON and switches the other of the first switch and the second switch OFF.

4. The power converter of claim 3, wherein during a second one of the $T_{OFF}$ phases, the state machine module switches the other of the first switch and the second switch ON and switches the other of the first switch and the second switch OFF.

5. The power converter of claim 1, wherein the state machine module includes:
   a first state wherein the first switch is OFF and the second switch is OFF;
   a second state wherein the first switch is ON and the second switch is ON;
   a third state wherein the first switch is OFF and the second switch is ON; and
   a fourth state wherein the first switch is ON and the second switch is OFF.

6. The power converter of claim 5, wherein the state machine module transitions:
   from the first state to the second state when a first skip signal is low and a clock signal transitions high.

7. The power converter of claim 5, wherein the state machine module transitions:
   from the second state to the third state when a second skip signal is low and the first switching signal is high; and
   from the third state to the fourth state when a third skip signal is low and the second switching signal is high.

8. The power converter of claim 7, wherein the state machine module transitions:
   from the fourth state to the second state when the clock signal transitions high; and
   from the third state to the second state when the clock signal transitions high.

9. The power converter of claim 5, wherein the state machine module transitions:
   from the second state to the fourth state when a second skip signal is high and the first switching signal is high; and
   from the fourth state to the second state when the clock signal transitions high.

10. The power converter of claim 5, wherein the state machine module transitions:
from the fourth state to the first state when the first skip signal is high; and
from the third state to the first state when the first skip signal is high.

11. The power converter of claim 1, wherein:
a first load is connected by one of a third switch and a first diode to the one terminal of the inductor;
a second load is connected by one of a fourth switch and a second diode to the another terminal of the inductor;
a negative voltage is supplied to the first load; and
a positive voltage is supplied to the second load.

12. The power converter of claim 1, wherein the first switching signal is HI when a first one of the error voltages is less than the voltage sum.

13. The power converter of claim 12, wherein the second switching signal is HI when a second one of the error voltages is less than the voltage sum and a third one of the error voltages is less than the voltage sum.

14. The power converter of claim 1, wherein a first one of the skip signals is HI when a first one of the error voltages is less than a predetermined skip threshold and a second one of the error voltages is less than the predetermined skip threshold.

15. The power converter of claim 14, wherein a second one of the skip signals is HI when the second one of the error voltages is less than the first one of the error voltages and a third one of the error voltages is less than the predetermined skip threshold.

16. The power converter of claim 14, wherein a third one of the skip signals is HI when the second one of the error voltages is less than the predetermined skip threshold and the third one of the error voltages is less than the predetermined skip threshold.

\* \* \* \* \*